United States Patent
Ogawa et al.

(10) Patent No.: US 7,305,022 B2
(45) Date of Patent: Dec. 4, 2007

(54) RAKE RECEIVER HAVING MIXR FUNCTION

(75) Inventors: Daisuke Ogawa, Kawasaki (JP);
Hideto Furukawa, Kawasaki (JP);
Takashi Dateki, Kawasaki (JP);
Masahiko Shimizu, Kawasaki (JP);
Tsuyoshi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 724 days.

(21) Appl. No.: 10/789,226

(22) Filed: Feb. 26, 2004

(65) Prior Publication Data

US 2005/0058183 A1   Mar. 17, 2005

(30) Foreign Application Priority Data

Sep. 12, 2003   (JP)   ............... 2003-321670

(51) Int. Cl.
*H04B 1/00*   (2006.01)
(52) U.S. Cl. ........................ 375/148; 375/346
(58) Field of Classification Search .............. 375/148
See application file for complete search history.

(56) References Cited

U.S. PATENT DOCUMENTS

| | | | |
|---|---|---|---|
| 5,917,851 A | | 6/1999 | Järvelä et al. |
| 6,026,115 A * | | 2/2000 | Higashi et al. ............. 375/148 |
| 6,175,587 B1 * | | 1/2001 | Madhow et al. ............. 375/148 |
| 6,507,605 B1 * | | 1/2003 | Fukumoto et al. .......... 375/152 |
| 6,549,565 B1 * | | 4/2003 | Buehrer et al. ............. 375/142 |
| 6,683,924 B1 * | | 1/2004 | Ottosson et al. ............ 375/343 |
| 7,027,421 B2 * | | 4/2006 | Park et al. .................. 370/335 |
| 7,106,785 B2 * | | 9/2006 | Yoshida ....................... 375/148 |
| 7,139,307 B2 * | | 11/2006 | Takahashi ................... 375/148 |
| 2001/0028677 A1 * | | 10/2001 | Wang et al. ................. 375/148 |
| 2002/0131479 A1 * | | 9/2002 | Butler et al. ................ 375/147 |
| 2003/0086482 A1 | | 5/2003 | Shimizu et al. |
| 2003/0108091 A1 * | | 6/2003 | Nishio et al. ............... 375/148 |

FOREIGN PATENT DOCUMENTS

| | | |
|---|---|---|
| EP | 0 749 215 | 3/1999 |
| JP | 2003-133999 | 5/2003 |
| WO | WO 01/29982 | 4/2001 |
| WO | WO02029996 | * 10/2001 |
| WO | WO 02/02996 | 4/2002 |
| WO | WO 02/052743 | 7/2002 |

OTHER PUBLICATIONS

European Search Report dated Jul. 26, 2004.

* cited by examiner

*Primary Examiner*—David C. Payne
*Assistant Examiner*—Leon-Viet Q Nguyen
(74) *Attorney, Agent, or Firm*—Katten Muchin Rosenman LLP

(57) ABSTRACT

MIXR is implemented with a realistic amount of hardware even when the number of detected paths is large. From among path timings detected by a path searcher and MICTs generated based on the detected path timings, as many timings as there are fingers are selected by a timing selector and the selected timings are assigned to the fingers. When selecting the timings, the value of SNIR expected to be achieved by RAKE combining in a RAKE combiner, for example, is predicted by calculation from a received signal, and the path timing and MICT that maximize the SNIR are selected.

30 Claims, 11 Drawing Sheets

RAKE RECEIVER HAVING MIXR FUNCTION

BACKGROUND OF THE INVENTION

1. Field of the Invention

The present invention relates to a RAKE receiver having a MIXR (Multipath Interference exchange Reduction) function that reduces interference by using MICT (Multipath Interference Correlative Timing).

2. Description of the Related Art

In a RAKE receiver, the result of despreading a received signal at each of the path timings of a plurality of paths detected from the received signal contains as interference the result of despreading the received signal from another path at a timing displaced from path timing thereof. Japanese Unexamined Patent Publication No. 2003-133999 describes how the interference from other paths is reduced using MIXR. To describe this briefly, consider the case of FIG. 1 where there are a path i with timing $t_{ii}$ and a path j with timing $t_{jj}$ between a transmitter and a receiver, and let X denote the value of the cross correlation between the received signal from the path j and the despreading code at the timing $t_{ii}$ of the path i, and Y denote the value of the cross correlation between the received signal from the path i and the despreading code at a timing $t_{ij}$ located at a position symmetric to the timing $t_{jj}$ with respect to the timing $t_{ii}$ on the time axis; in this case, X is equal to Y because the timings of the despreading codes are displaced equally with respect to the respective received signals. This means that the result of the despreading performed at the timing $t_{ij}$ contains an interference component from the path j when despreading was performed at the timing of the path i. Accordingly, if the result of the despreading performed at the timing $t_{ij}$ is appropriately weighted and added to the result of the despreading performed at the timing of the path i, the interference component from the path j can be reduced. This timing $t_{ij}$ is called the multipath interference correlative timing (MICT) for $t_{ii}$ with respect to $t_{jj}$, and the addition by appropriate weighting is called the MIXR combining.

Here, suppose that N paths have been detected as a result of path timing detection by a path search. As shown in FIG. 1, two timings $t_{ij}$ and $t_{ji}$ can be considered as the MICTs for the paths i and j. Here, $MICTt_{ij}$ is obtained by the following equation.

$$t_{ij} = 2t_{ii} - t_{jj} \quad (1)$$

However, if all the MICTs are to be calculated using the equation (1), the total number of MICTs and path timings will be the square of the number, N, of paths. If all of these timings are to be assigned to fingers, there arises the problem that as the number of paths increases, the amount of necessary hardware will increase prohibitively.

SUMMARY OF THE INVENTION

Accordingly, it is an object of the present invention to provide a RAKE receiver that can implement MIXR with a realistic amount of hardware even when the number of paths is large.

A RAKE receiver having a MIXR function according to the present invention comprises: a path searcher which detects path timings of a plurality of paths from a received signal; a MICT generator which, for each of the plurality of path timings detected by the path searcher, generates MICT (Multipath Interference Correlative Timing) with a path of another path timing as an interference path; a timing selector which selects path timings and MICTs from among all the detected path timings and all the generated MICTs in such a manner that the total number of timings becomes equal to a predetermined number; a plurality of fingers which despread the received signal at the respective path timings and MICTs selected by the timing selector, wherein the number of fingers is equal to the predetermined number; a MIXR combiner which, if an MICT has been selected for a path timing, combines the result of despreading performed at the timing of the MICT with the result of despreading performed at the path timing by using a MIXR (Multipath Interference exchange Reduction) technique; and a RAKE combiner which combines outputs of the MIXR combiner by using a RAKE combining technique.

The path timing selector includes, for example, a first processing means for first selecting one path timing from among the plurality of path timings, a second processing means for determining one of unselected MICTs as a candidate for selection for the selected path timing, a third processing means for selecting one timing from among unselected path timings and the MICT determined as the candidate for selection, and a fourth processing means for causing processing in the second and third processing means to be repeated until the number of selected timings reaches the predetermined number.

The timing selector calculates SNIR (Signal to Noise and Interference Ratio) for each path timing and an increase in SNIR expected to be achieved by MIXR combining for each MICT, and selects the predetermined number of timings in decreasing order of the SNIR and in order of decreasing magnitude of the SNIR increase.

In this case, the path timing selector calculates the increase in SNIR expected to be achieved by the MIXR combining by evaluating an improvement $\eta_{ij}$ in SNIR expected to be achieved by the MIXR combining performed, for example, using a MICT for a path i with a path j as an interference path, the improvement $\eta_{ij}$ being calculated by the equation $$\eta_{ij} = 1 + \frac{|\alpha_j|^2}{|\alpha_i|^2}$$

where $|\alpha_i|^2$ and $|\alpha_j|^2$ are signal powers for the paths i and j, respectively.

The timing selector includes a fifth processing means for selecting all the path timings, and a sixth processing means for selecting MICTs in a prescribed order after selecting all the path timings, until the total number of selected timings reaches the predetermined number.

A receiver for receiving a direct code spread signal according to the present invention comprises: first timing detecting means for detecting path timings of multipaths; second timing detecting means for detecting, based on each of the detected timings, a timing for obtaining an interference reducing signal; timing assigning means for assigning selected ones of the plurality of timings detected by the first and second timing detecting means to a plurality of despreaders, respectively; and a combiner for combining outputs of the plurality of despreaders.

Here, the timing that the second timing detecting means detects is the so-called MICT. The timing assigning means corresponds to the earlier described timing selector. The combiner has, for example, both the MIXR combining and RAKE combining functions.

The effect is that, as the number of timings can be limited to the predetermined number when performing interference cancellation, the number of spreaders can be reduced. Further, as the number of points at which despreading is to be performed simultaneously is reduced, power consumption due to despreading can be reduced while performing interference cancellation.

The second timing detecting means is a means for detecting, for example, on a time axis, a timing located at a position symmetric to another timing which is one of the timings detected by the first timing detecting means, the two timings being located symmetrically to each other with respect to a selected one of the timings likewise detected by the first timing means, and the timing assigning means also assigns the selected one of the timings when assigning the timing detected by the second timing detecting means.

In one method of implementing this, the embodiment to be described later employs an algorithm for making a decision as to whether to use a corresponding MICT, or not, for a multipath. According to this algorithm, interference cancellation can be achieved while limiting the number of timings.

The timing assigning means includes a changing means for changing, for example, any one of the assigned timings to another timing based on signal quality after the RAKE combining so as to improve the quality.

According to the present invention, MIXR can be implemented with a realistic amount of hardware even when the number of paths is large.

DESCRIPTION OF THE PREFERRED EMBODIMENTS

Figure 2:
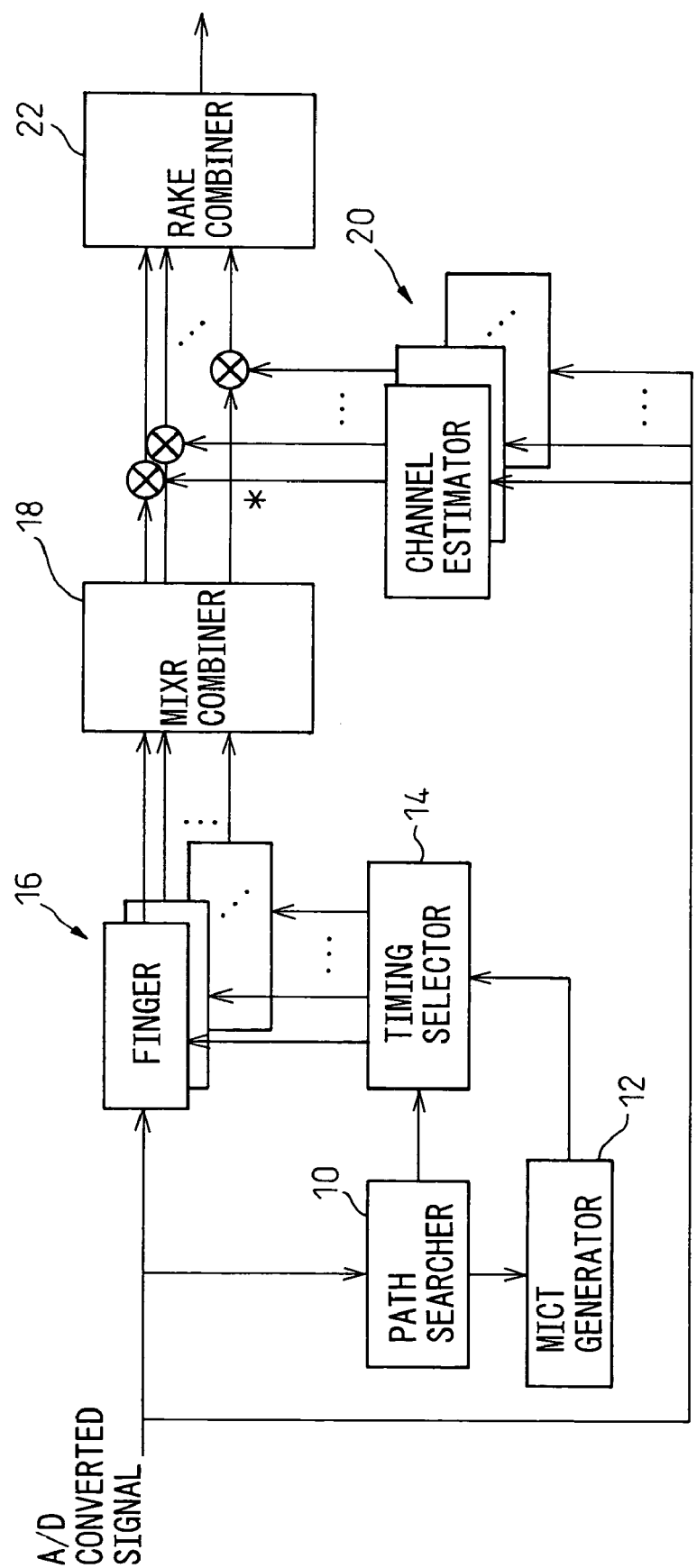
FIG. 2 is a block diagram showing one configuration example of a RAKE receiver having a MIXR function according to one embodiment of the present invention.

FIG. 2 shows in simplified form the configuration of a RAKE receiver having a MIXR (Multipath Interference exchange Reduction) function according to one embodiment of the present invention. In FIG. 2, a path searcher 10 detects path timings from an A/D converted received signal. A MICT generator 12 generates all possible multipath interference correlative timings (MICTs) in accordance with the equation (1) from the path timings detected by the path searcher 10.

A timing selector 14, based on criteria to be described later, selects as many timings as there are fingers 16 from among the path timings detected by the path searcher 10 and the MICTs generated by the MICT generator 12, and supplies the selected timings to the respective fingers 16. Each of the fingers 16 despreads the received signal at the timing supplied from the timing selector 14, and outputs the despread received signal. For any path for which the corresponding MICT has been selected, a MIXR combiner 18 applies an appropriate weight to the result of despreading at the MICT and adds the weighted result to the result of the despreading performed at that path timing. A RAKE combiner 22 performs RAKE combining by multiplying the result of despreading each path by the complex conjugate of a channel estimate output from a channel estimator 20; here, for the paths on which the MIXR combining is done, the RAKE combining is performed using the results of the MIXR combining.

Figure 3:
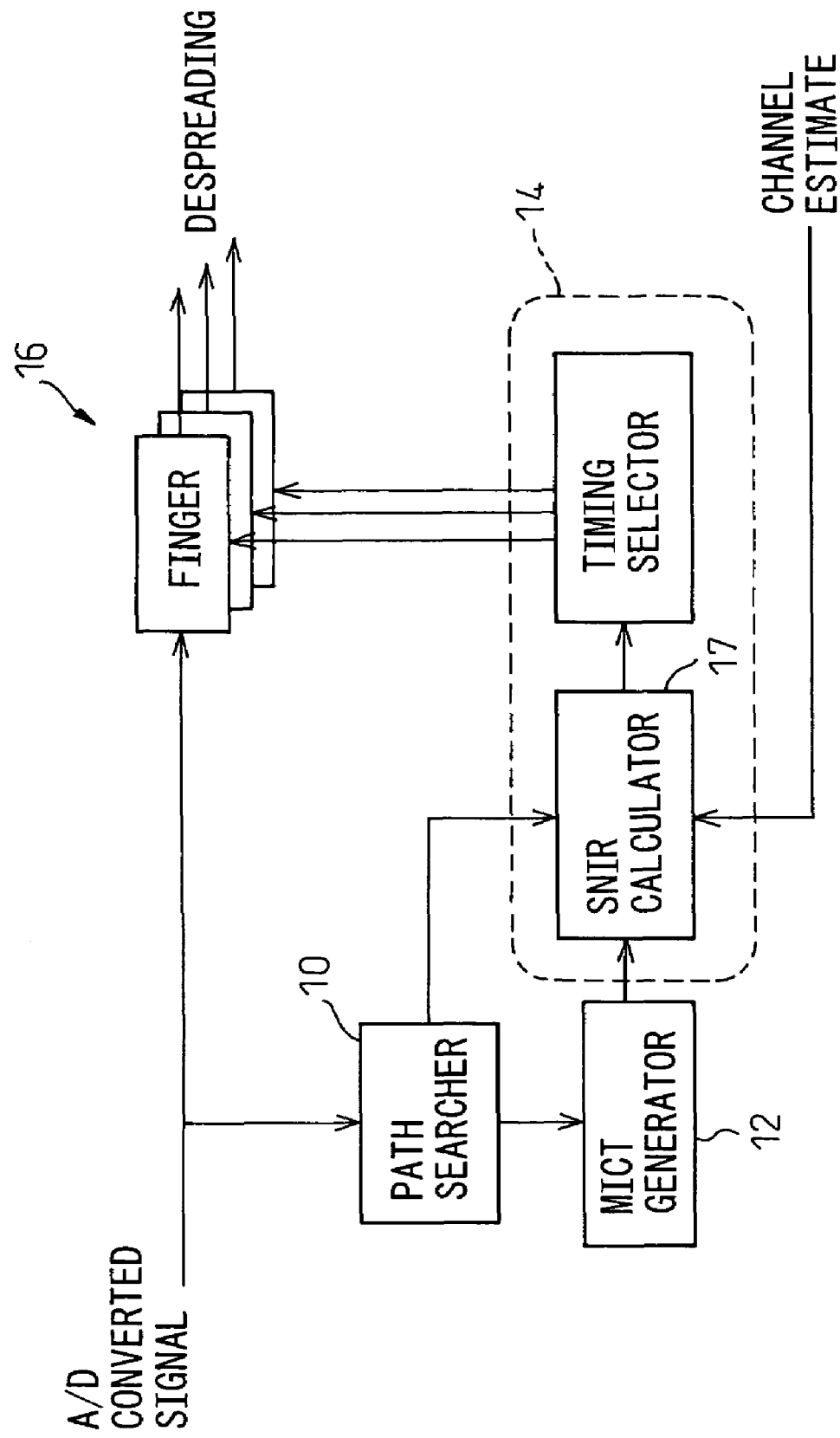
FIG. 3 is a block diagram showing the configuration of a timing selector 14 in FIG. 2.
Figure 4:
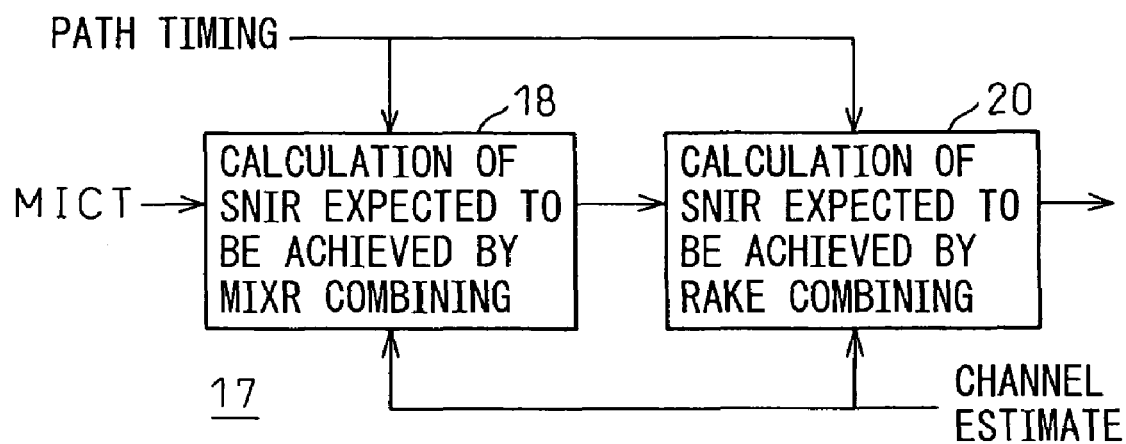
FIG. 4 is a block diagram showing the configuration of a SNIR calculator 17 in FIG. 3.

As shown in FIG. 3, the timing selector 14 selects the path timings and MICTs based on the results of the SNIR (Signal to Noise and Interference Ratio) calculations performed by an SNIR calculator 17 for various combinations of path timings and MICTs. As shown in FIG. 4, for any path for which the corresponding MICT has been selected, the SNIR calculator 17 calculates the SNIR ($SNIR_{MIXR}$) expected to be achieved by the MIXR combining (18) and then, using the result, calculates the SNIR ($SNIR_{RAKE}$) expected to be achieved by the RAKE combining (20).

Figure 1:
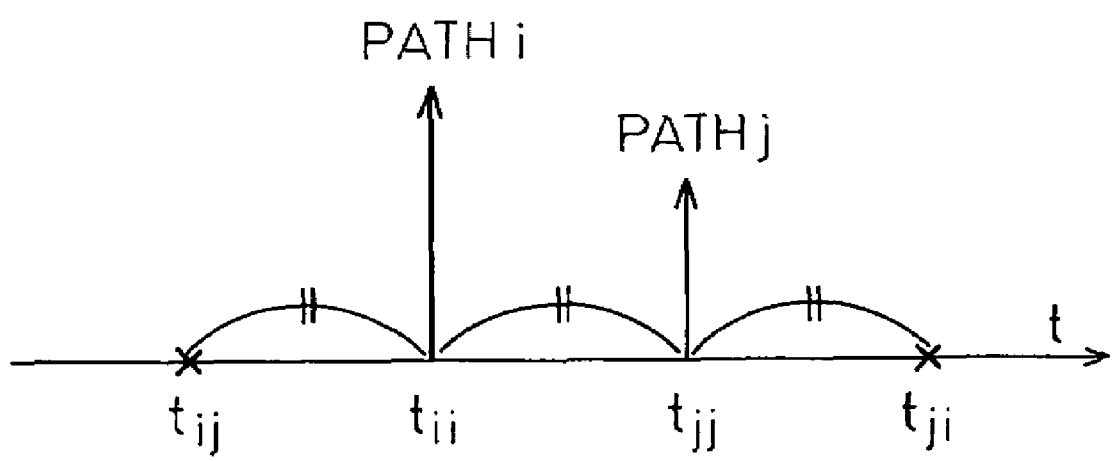
FIG. 1 is a diagram for explaining MICT.

When the result of despreading at $MICT_{tij}$ is appropriately weighted and MIXR-combined with the result of despreading at the path timing $t_{ii}$ in FIG. 1, the SNIR improvement $\eta_{ij}$ is given as $$\eta_{ij} = \frac{\sigma_i^2}{\sigma_i^2 - \frac{|\alpha_i|^2|\alpha_j|^2 I^4}{RSSI}} \tag{2}$$

Here, $\alpha_i$ and $\alpha_j$ are channel estimates for the paths i and j, respectively, $|\alpha_i|^2$ and $|\alpha_j|^2$ are signal powers for the paths i and j, respectively, $I^2$ is the transmitting power of the transmitter estimated at the receiving end, $\sigma_i^2$ is the signal variance at the path i, and RSSI is the received signal intensity.

The SNIR improvement $\eta_i$ when MIXR combining is performed for the path i by using an arbitrary number of MICTs is given by the following equation.

$$\eta_i = \frac{\sigma_i^2}{\sigma_i^2 - \sum_{k \neq 1} \frac{|\alpha_i|^2|\alpha_k|^2 I^4}{RSSI} \cdot a_{ik}} \tag{3}$$

Here, $a_{ik}$ takes the following value.

1 (when MICT of timing $t_{ik}$ is used)

0 (when MICT of timing $t_{ik}$ is not used)

Figure 5:
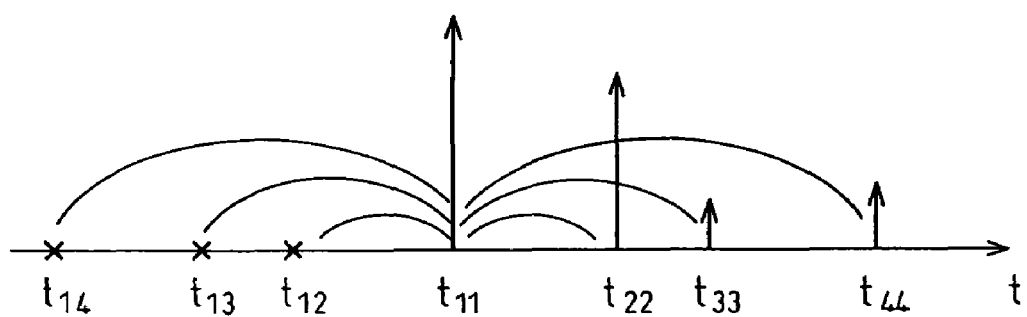
FIG. 5 is a diagram for explaining how MICTs are selected.

For example, in the example of FIG. 5 in which the number of detected paths is four, i.e., $t_{11}$, $t_{22}$, $t_{33}$, and $t_{44}$, when MIXR combining is performed for the path of $t_{11}$ by using only the MICT of timing $t_{12}$, $a_{ik}$ in the equation (3) is $a_{12}=1$, $a_{13}=0$, and $a_{14}=0$. When $t_{14}$ is further used, then $a_{12}=1$, $a_{13}=0$, and $a_{14}=1$.

When MIXR combining is performed between path timing $t_{ii}$ and $MICT_{ij}$, $SNIR_{MIXR}(i)$ representing the SNIR of the path i after the MIXR combining is calculated by the following equation using the improvement $\eta_{ij}$ given by the equation (2).

$$SNIR_{MIXR}(i)=SNIR(i)\times\eta_{ij} \quad (4)$$

Here, SNIR(i) representing the SNIR of the path i before the MIXR combining is obtained from $$SNIR(i) = \frac{|\alpha_i|^2}{\sigma_i^2} \quad (5)$$

$SNIR_{MIXR}(i)$ when MIXR combining is performed using an arbitrary number of MICTs is calculated by the following equation using $\eta_i$ given by the equation (3).

$$SNIR_{MIXR}(i)=SNIR(i)\times\eta_i \quad (6)$$

When the paths i and j are RAKE-combined, $SNIR_{RAKE}$ representing the SNIR after the RAKE combining can be expressed as shown below by using the SNIR(i) and SNIR(j) of the respective paths i and j.

$$SNIR_{RAKE} = \left(\frac{1}{2} + \frac{|\alpha_i|^2|\alpha_j|^2}{|\alpha_i|^4 + |\alpha_j|^4}\right) \cdot (SNIR(i) + SNIR(j)) \quad (7)$$

For any path for which MIXR combining is performed before the RAKE combining, $SNIR_{MIXR}(i)$ given by the equation (4) or (6) is used instead of SNIR(i) in the equation (7).

The timing selector 14 can, for example, calculate the SNIR ($SNIR_{RAKE}$) expected to be achieved by the RAKE combining by using the equations (3), (5), (6), and (7) for each of all possible combinations of path timings and MICTs, the total number of timings being equal to the number of fingers 16, and can determine the most appropriate combination of the path timing and MICT by selecting the combination that gives the largest $SNIR_{RAKE}$. This method, however, requires an enormous computation time, but the computation time can be shortened by selecting the timings in accordance with the following procedure.

Figure 6:
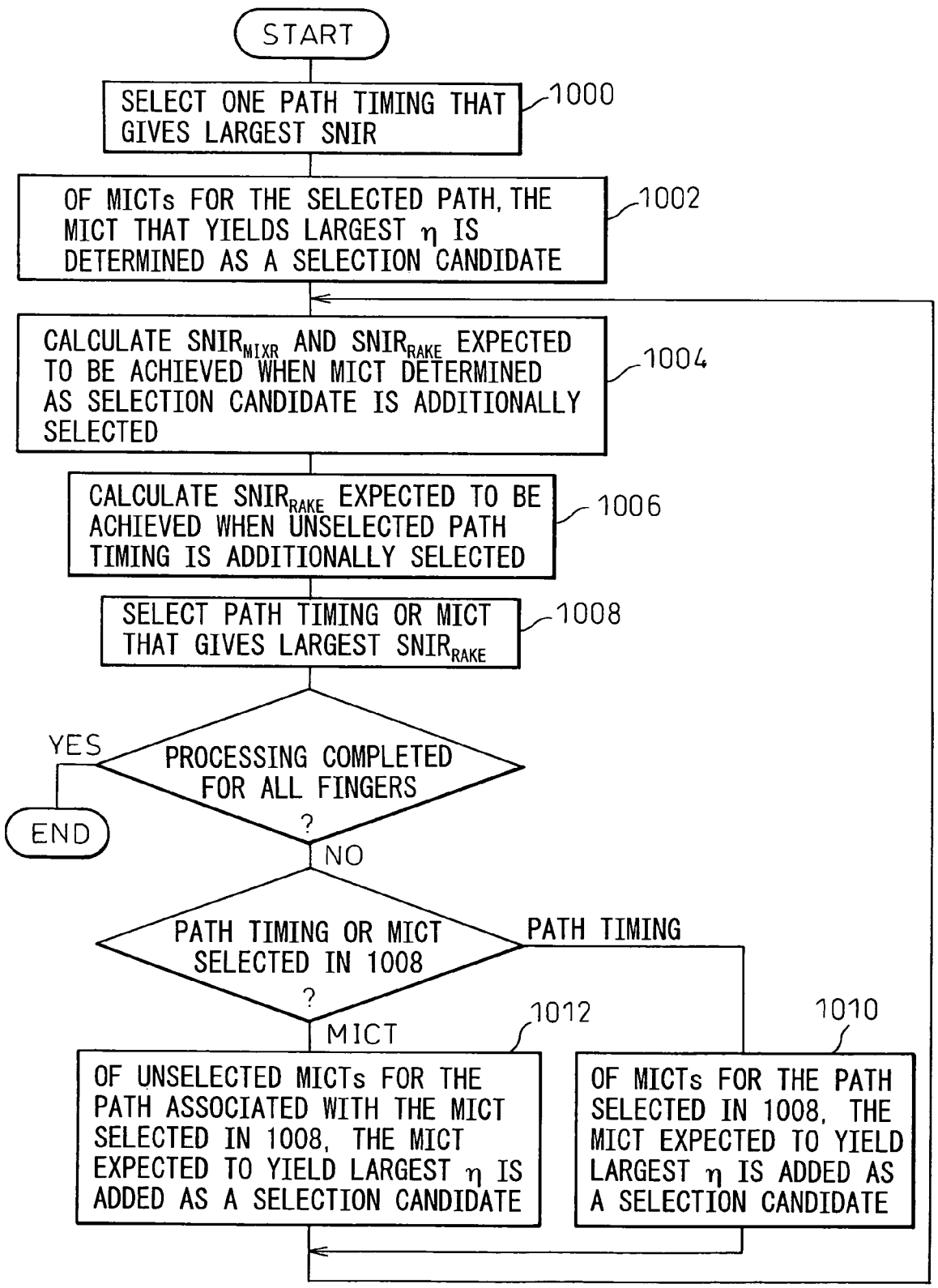
FIG. 6 is a flowchart illustrating one example of a selection process in the timing selector 14.

FIG. 6 is a flowchart illustrating one example of the timing selection process in the timing selector 14. In FIG. 6, the timings are selected in the following sequence.

SNIR of each path is calculated using the equation (5), and one path timing that gives the largest SNIR is selected (step 1000).

SNIR improvement $\eta_{ij}$ is calculated using the equation (2) for each MICT for the selected path, and the MICT that yields the largest $\eta_{ij}$ is determined as a candidate for selection (step 1002).

For the MICT determined as the selection candidate (if two or more MICTs have been determined as selection candidates, then for each of the candidates), $SNIR_{MIXR}$ expected to be achieved when the MICT is additionally selected is calculated using the equations (3) and (6), and then $SNIR_{RAKE}$ is calculated (step 1004).

For each of unselected path timings, the $SNIR_{RAKE}$ expected to be achieved when the path timing is additionally selected is calculated (step 1006).

Based on the results of steps 1004 and 1006, the path timing or MICT that gives the largest $SNIR_{RAKE}$ is selected (step 1008).

Steps 1004, 1006, and 1008 are repeated until processing is completed for all the fingers. In this case, if path timing is selected in step 1008, then the MICT that yields the largest $\eta_{ij}$ in accordance with the equation (2) (or $\eta_i$ in accordance with the equation (3)) is selected from among the MICTs for the selected path, and added as a selection candidate (step 1010); on the other hand, if MICT is selected in step 1008, then among the unselected MICTs for the path associated with the selected MICT, the MICT expected to yield the largest $\eta_i$ in accordance with the equation (3) when the MICT is additionally selected is added as a selection candidate (step 1012).

In the equation (5), the signal variance $\sigma_i^2$ may be assumed to be constant regardless of the path and, in step 1000, the path that gives the largest signal power $|\alpha_i|^2$ may be selected, rather than selecting the path that gives the largest SNIR(i) by calculating the SNIR(i) in accordance with the equation (5).

Figure 7:
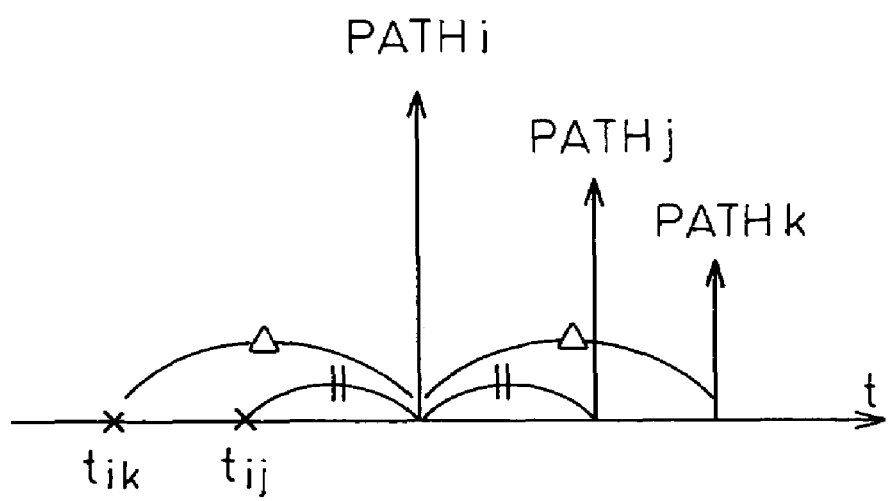
FIG. 7 is a diagram for explaining how a MICT is determined as a candidate for selection.

When determining the selection candidates in steps 1002, 1010, and 1012, the MICT where the signal power $|\alpha_j|^2$ or the SNIR(j) of the interference path j is the largest may be determine as the selection candidate, rather than determining as the selection candidate the MICT that yields the largest $\eta_{ij}$ or $\eta_i$. To explain this using the example of FIG. 7, when determining either $t_{ik}$ or $t_{ij}$, both the MICTs for the path i, as the selection candidate, $|\alpha_k|^2$ and $|\alpha_j|^2$ (the lengths of the arrows in FIG. 7) or SNIR(k) and SNIR(j) are compared to determine the selection candidate, instead of calculating $\eta_{ik}$ and $\eta_{ij}$ and comparing them.

In step 1004, rather than calculating the equations (3) and (6) to obtain the $SNIR_{MIXR}(i)$ expected to be achieved when the selected MICT is added, the equation (3) may be approximated by the equation (2) by noting only the path i and the interference path j and the $SNIR_{MIXR}(i)$ may be calculated by using the equation (2) and (4). By so doing, the effect of each of the plurality of MICTs for one path can be evaluated independently of whether any other MICT is selected or not.

Further, the equation (2) can be approximated as shown below if it is assumed that the noise component is uncorrelated.

$$\eta_{ij} = 1 + \frac{|\alpha_i|^2}{|\alpha_j|^2} \quad (8)$$

If the SMIR(i) is obtained using the equation (8) instead of the equation (2), the calculation can be simplified.

Alternatively, the SNIR(i) may be obtained using the following equation instead of the equation (8).

$$\eta_{ij} = 1 + \frac{|\alpha_j|^2}{|\alpha_i|^2} \quad (9)$$

Further, if the equation (7) is approximated as $$SNIR_{RAKE} = SNIR(i) + SNIR(j) \quad (10)$$

the effect of the MICT selection for each different path timing can be evaluated independently without calculating $SNIR_{RAKE}$.

Figure 8:
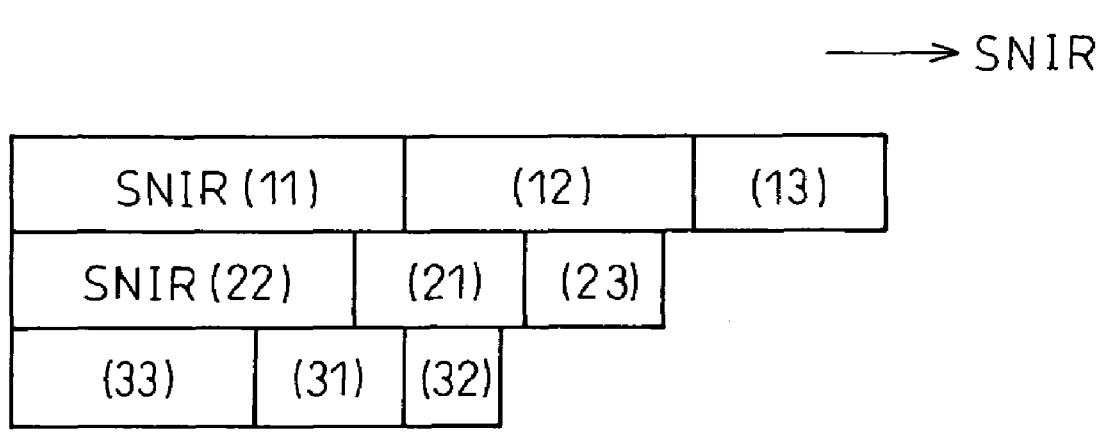
FIG. 8 is a diagram for explaining another example of the selection process in the timing selector 14.

In this case, the increase SMIR(ij) in SNIR expected to be achieved when each MICT is selected is calculated in advance by using $\eta_{ij}$ calculated by the equation (2), (8), or (9); then, the SNIR(ii) of each path timing and the SNIR(ij) of the MICT calculated in advance are compared, and path timings and MICTs are selected in order of decreasing magnitude of SNIR(ii) or SNIR(ij). This serves to speed up the selection process. FIG. 8 shows the case of three paths. In the example shown in FIG. 8, timings $t_{11}$, $t_{22}$, $t_{12}$, $t_{33}$, . . . are selected in this order in order of decreasing magnitude.

Figure 9:
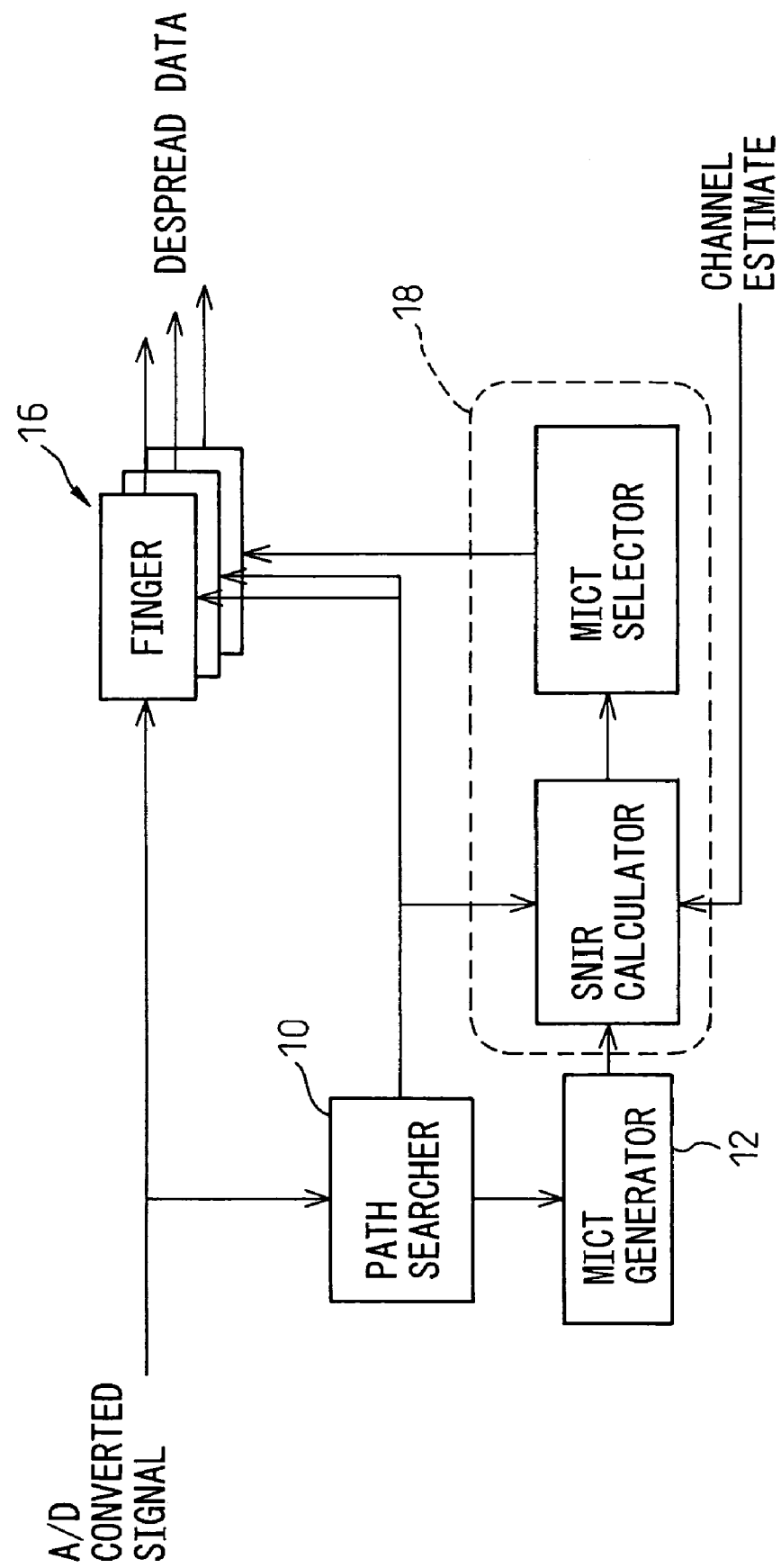
FIG. 9 is a block diagram showing still another example of the selection performed in the timing selector 14.

FIG. 9 shows another example of the selection performed in the timing selector 14. In this example, all of the path timings detected by the path searcher 10 are selected and supplied to the fingers 16, and as many MICTs as there are remaining fingers 16 are selected in the timing selector 14 from the MICTs generated by the MICT generator 12.

Figure 10:
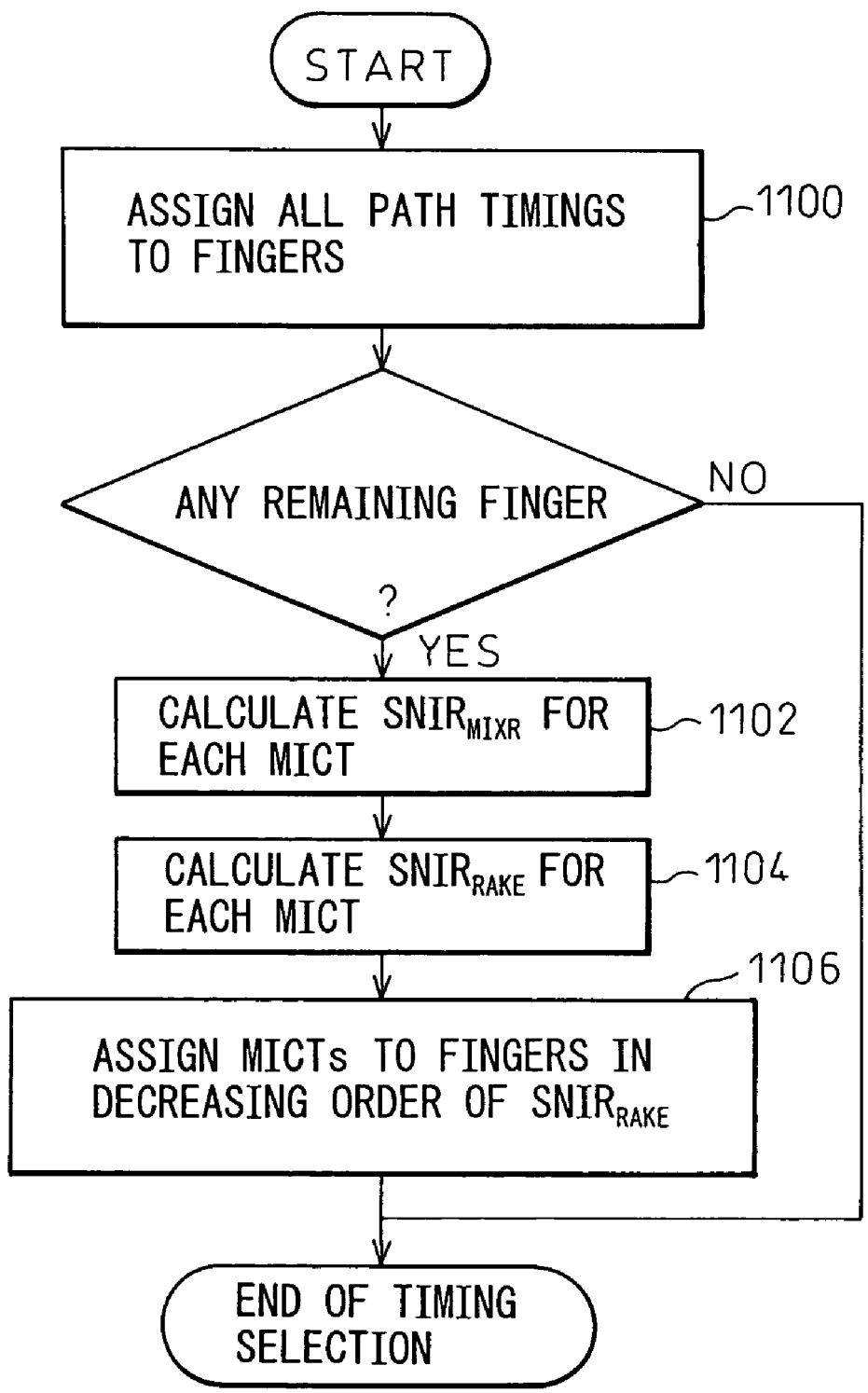
FIG. 10 is a flowchart illustrating the details of the selection process shown in FIG. 9.

FIG. 10 shows a flowchart of the process performed in the timing selector 14 of the above example. In FIG. 10, first, all the path timings detected by the path searcher 10 are assigned to the fingers (step 1100), and if there is any remaining finger, then for each MICT generated by the MICT generator 12 the $SNIR_{MIXR}$ expected to be achieved when the MICT is selected is calculated using the equations (2), (4), and (5) (step 1102), and $SNIR_{RAKE}$ is calculated using the equation (7) (step 1104). Then, the MICTs are assigned to any remaining fingers in decreasing order of $SNIR_{RAKE}$ (step 1106).

Transformations and simplifications similar to those in the selection process described with reference to FIG. 6 can also be applied in the selection process shown in FIG. 10. That is, in the calculation of $SNIR_{MIXR}$ in step 1102, the signal power $|\alpha_i|^2$ may be used instead of the SNIR(i) in the equation (4) to calculate the $SNIR_{MIXR}$ as $$SNIR_{MIXR}(i) = |\alpha_i|^2 \times \eta_{ij} \quad (11)$$

Alternatively, $SNIR_{MIXR}(i)$ may be evaluated using the SNIR(j) or $|\alpha_j|^2$ of the interference path j.

Here, $\eta_{ij}$ in the equation (4) or (11) may be calculated using the equation (8) or (9) instead of using the equation (2).

Further, if the equation (7) is approximated as the equation (10), $SNIR_{RAKE}$ need not be calculated in step 1104, but the MICTs can be selected by only comparing the $SNIR_{MIXR}$ (i) evaluated in step 1102 as described above, that is, $|\alpha_i|^2 \times \eta_{ij}$ or SNIR(j) or $|\alpha_j|^2$.

Figure 11:
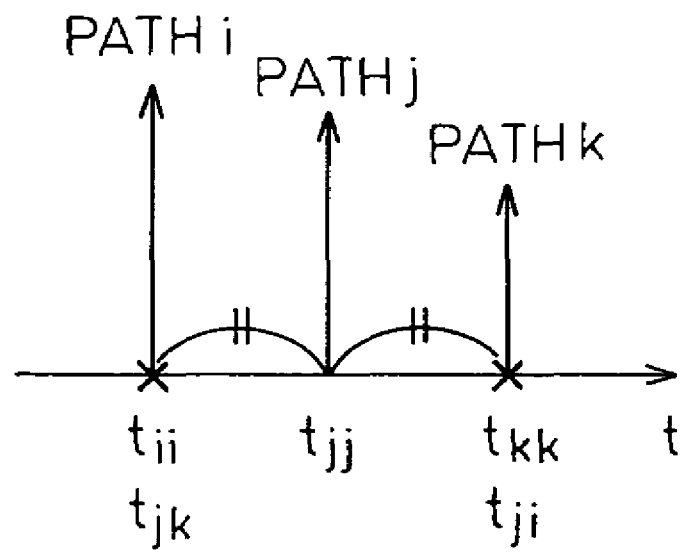
FIG. 11 is a diagram showing an example in which a path timing and a MICT overlap each other.

In the selection process of the timing selector 14 thus far described, there can occur cases where some of the path timings detected by the path searcher 10 and some of the MICTs generated by the MICT generator 12 overlap each other on the time axis. FIG. 11 shows the case where the path timing $t_{ij}$ of the path i and the timing $t_{jk}$, the MICT for the path j with respect to the path k, overlap each other, while the path timing $t_{kk}$ of the path k and the timing $t_{ji}$, the MICT for the path j with respect to the path i, overlap each other. In such cases, rather than selecting both of the two overlapping timings and supplying them to two fingers, either the timing that gives the larger SNIR is selected or the path timing rather than the MICT is always selected. Alternatively, the two overlapping timings may be jointly assigned to one finger, and the result of despreading there may be used as the result of despreading at the path timing as well as the result of despreading at the MICT.

Figure 12:
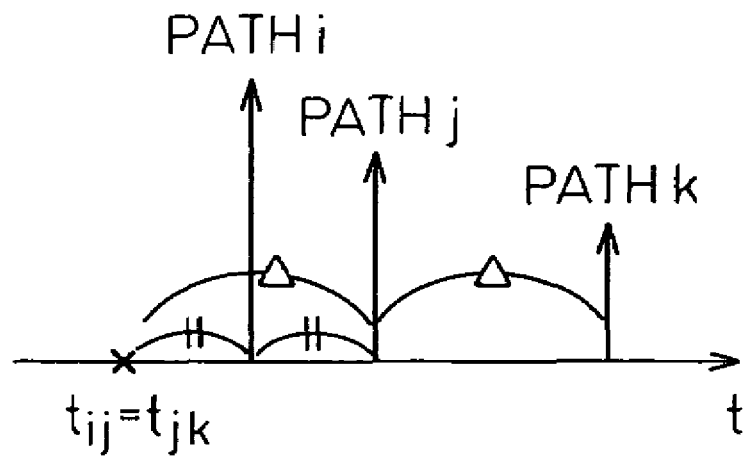
FIG. 12 is a diagram for explaining the case where two MICTs overlap each other.

There can also be cases where two MICT timings overlap each other as shown in FIG. 12. In such cases, only the MICT that gives the larger SNIR is selected. Instead of comparing the SNIR, the selection may be made by comparing the $|\alpha_j|^2$ or SNIR(j) of the interference path. Alternatively, the two MICT timings may be jointly assigned to one finger, and the result of despreading there may be used as the result of despreading at the two MICTs.

Figure 13:
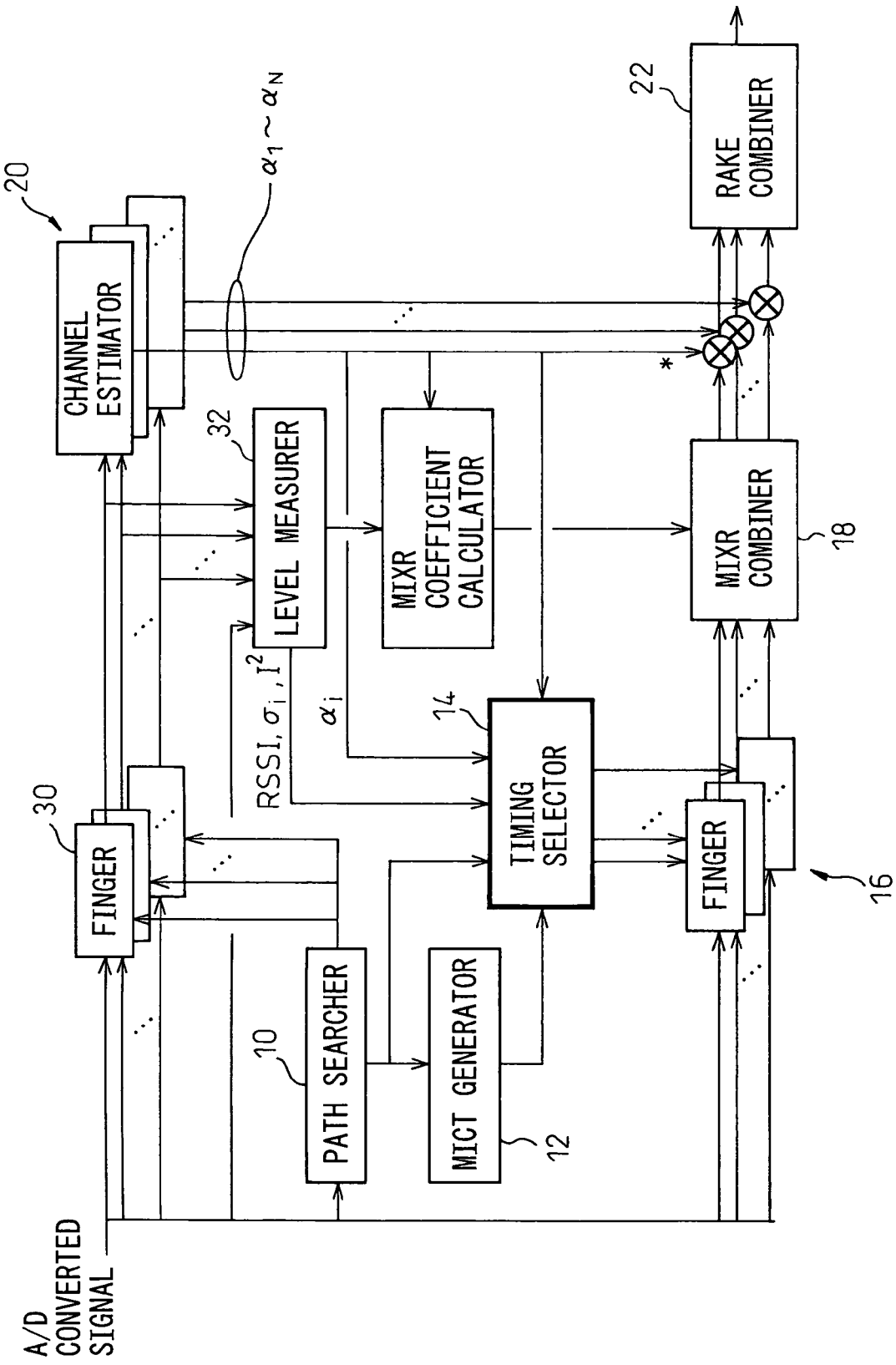
FIG. 13 is a block diagram in which a configuration for obtaining data necessary for timing selection is added to the configuration of FIG. 2.

FIG. 13 is a block diagram in which a configuration for obtaining data necessary for the selection in the timing selector 14 and data necessary for the calculation of MIXR coefficients in the MIXR combiner 18 is added to the configuration of FIG. 2.

In FIG. 13, fingers 30 which perform despreading using despreading codes for channel estimation data are provided in addition to the fingers 16 which perform despreading using despreading codes for recovering user data, and the outputs of the fingers 30 are supplied to the channel estimators 20 where channel estimates $\alpha_i$ are calculated. A level measurer 32 calculates RSSI, $\sigma_i^2$, and $I^2$ from the A/D converted received data and the despreading results output from the fingers 30.

Figure 14:
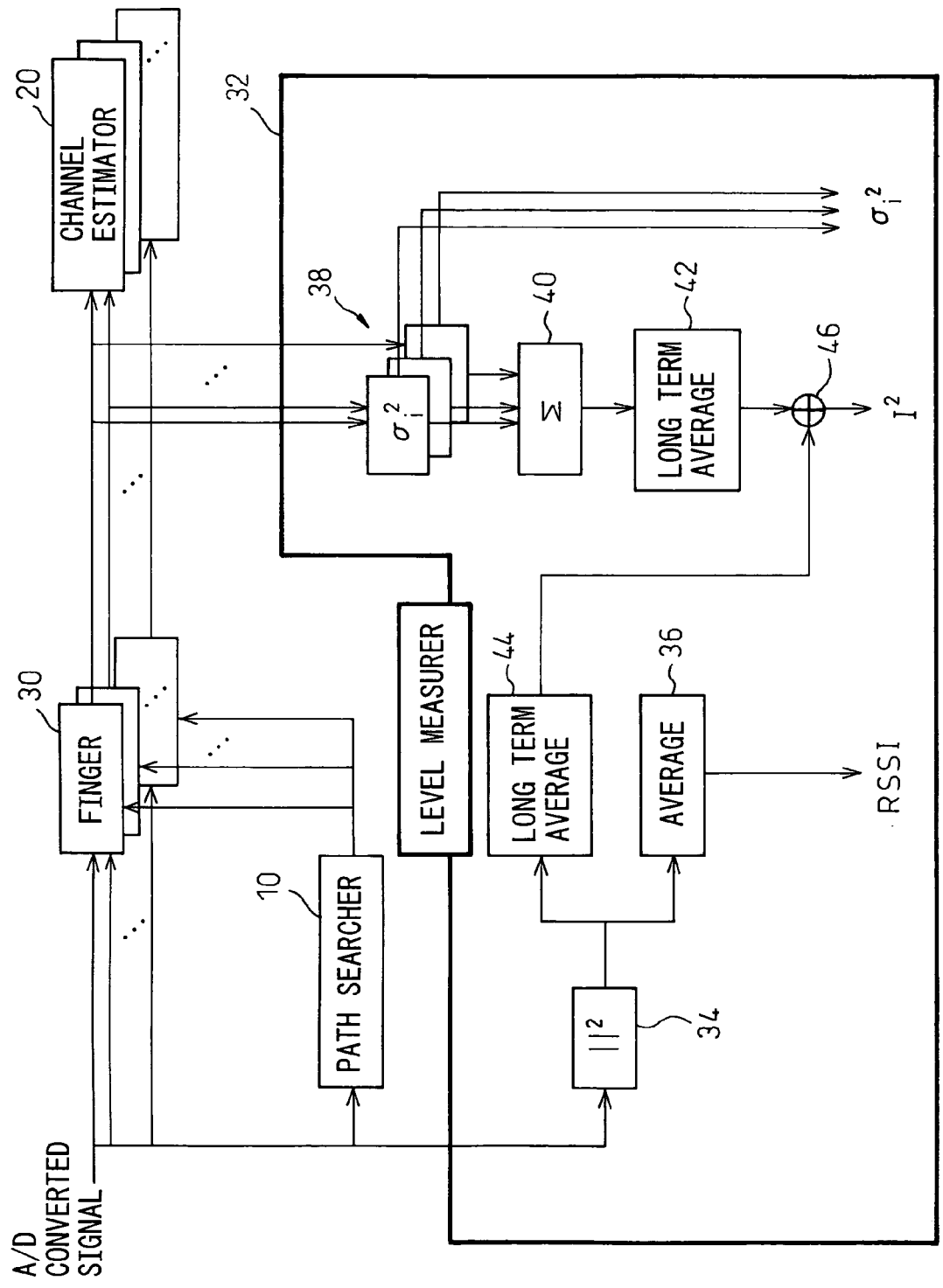
FIG. 14 is a diagram showing the details of a level measurer in FIG. 13.

FIG. 14 shows the detailed configuration of the level measurer 32. As shown in FIG. 14, RSSI is calculated by taking the average (36) of the received signal intensities (34). Further, $\sigma_i^2$ is obtained by calculating the variance (38) of the output of each finger 30 for each path, and $I^2$ is calculated by subtracting the long term average (42) of the sums (40) for all the paths from the long term average (44) of the received signal intensities.

The invention claimed is:

1. A RAKE receiver having a MIXR function, comprising:
    a path searcher which detects path timings of a plurality of paths from a received signal;
    a MICT generator which generates MICT (Multipath Interference Correlative Timing) for each of the plurality of path timings detected by the path searcher;
    a timing selector which selects path timings and MICTs from among the detected path timings and the generated MICTs in such a manner that the total number of timings becomes equal to a predetermined number;
    a despreader which despreads the received signal at each of the path timings and the MICTs selected by the timing selector;
    a combiner which, if an MICT has been selected for a path timing, combines the result of despreading performed at the timing of the MICT with the result of despreading performed at the path timing; and
    a RAKE combiner which combines outputs of the combiner by using a RAKE combining technique.

2. A RAKE receiver according to claim 1, wherein the path timing selector includes:
    first processing means for first selecting one path timing from among the plurality of path timings;
    second processing means for determining one of unselected MICTs as a candidate for selection for the selected path timing;
    third processing means for selecting one timing from among unselected path timings and to MICT determined as the candidate for selection; and
    fourth processing means for causing processing in the second and third processing means to be repeated until the number of selected timings reaches the predetermined number.

3. A RAKE receiver according to claim 2, wherein the first processing means selects the pat timing where the value of SNIR (Signal to Noise and Interference Ratio) is the largest.

4. A RAKE receiver according to claim 2, wherein the first processing means selects the path timing where the signal power is the largest.

5. A RAKE receiver according to claim 2, wherein the second processing means determines, as the candidate for selection, the MICT that is evaluated as being most effective in improving SNIR when MIXR combining is done.

6. A RAKE receiver according to claim 2, wherein the second processing means determines as the candidate for selection the MICT where the signal power or SNIR of an interference pat is the largest.

7. A RAKE receiver according to claim 2, wherein the third processing means selects the path timing or MICT where SNIR expected to be achieved by RAKE combining after MIXR combining performed by adding the selected timing is evaluated as being the largest.

8. A RAKE receiver according to claim 7, wherein the third processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = \frac{\sigma_i^2}{\sigma_i^2 - \frac{|\alpha_i|^2 |\alpha_j|^2 I^2}{RSSI}}$$

where $\sigma_i^2$ is signal variance at the path i, $|\alpha_i|^2$ and $|\alpha_j|^2$ are signal powers for the paths i and j, respectively, $I^2$ is a transmitter's transmitting power estimated at receiving end, and RSSI is received signal intensity.

9. A RAKE receiver according to claim 7, wherein the third processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_i|^2}{|\alpha_j|^2}$$

where $|\alpha_i|^2$ and $|\alpha_j|^2$ are signal powers for the paths i and j, respectively.

10. A RAKE receiver according to claim 7, wherein the third processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_j|^2}{|\alpha_i|^2}$$

where $|\alpha_i|^2$ and $|\alpha_j|^2$ are signal powers for the paths i and j, respectively.

11. A RAKE receiver according to claim 1, wherein the timing selector calculates SNIR for each path timing and an increase in SNIR expected to be achieved by MIXR combining for each MICT, and selects the predetermined number of timings in decreasing order of the SNIR and in order of decreasing magnitude of the SNIR increase.

12. A RAKE receiver according to claim 11, wherein the path timing selector calculates the increase in SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_j|^2}{|\alpha_i|^2}$$

where $|\alpha_i|^2$ and $|\alpha_j|^2$ are signal powers forte paths i and j, respectively.

13. A RAKE receiver according to claim 1, wherein the timing selector includes:
fifth processing means for selecting all the path timings; and
sixth processing means for selecting MICTs in a prescribed order after selecting all the path timings, until the total number of selected timings reaches the predetermined number.

14. A RAKE receiver according to claim 13, wherein the sixth processing means selects MICTs in decreasing order of SNIR expected to be achieved by RAKE combining after MIXR combining.

15. A RAKE receiver according to claim 13, wherein the sixth processing means selects MICTs in decreasing order of a value obtained by multiplying path signal power with an SNIR improvement achieved by MIXR combining.

16. A RAKE receiver according to claim 13, wherein the sixth processing means selects MICTs in order of decreasing magnitude of the signal power or SNIR of an interference path.

17. A RAKE receiver according to claim 14, wherein the sixth processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = \frac{\sigma_i^2}{\sigma_i^2 - \frac{|\alpha_i|^2 |\alpha_j|^2 I^2}{RSSI}}$$

where $\sigma_i^2$ is signal variance at the path $|\alpha_i|^2$ and $|\alpha_j|^2$ are signal powers for the paths i and j, respectively, $I^2$ is a transmitter's transmitting power estimated at receiving end, and RSSI is received signal intensity.

18. A RAKE receiver according to claim 14, wherein the sixth processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_i|^2}{|\alpha_j|^2}$$

where $|\alpha_i|^2$ and $|\alpha_j|^2$ are signal powers for the paths i and j, respectively.

19. A RAKE receiver according to claim 14, wherein the sixth processing means evaluates the SNIR expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_j|^2}{|\alpha_i|^2}$$

where $|\alpha_i|^2$ and $|\alpha_j|^2$ are signal powers for the paths i and j, respectively.

20. A RAKE receiver according to claim 1, wherein when one of the path timings detected by the path searcher and one of the MICTs generated by the MICT generator overlap each other on a time axis, the timing selector selects the one which gives the larger SNIR.

21. A RAKE receiver according to claim 1 wherein, when one of the path timings detected by the path searcher and one of the MICTs generated by the MICT generator overlap each other on a time axis, the timing selector selects only the path timing.

22. A RAKE receiver according to claim 1 wherein, when one of the path timings detected by the path searcher and one of the MICTs generated by the MICT generator overlap each other on a time axis, the timing selector uses die result of despreading at the overlapped timing as the result of despreading at the path timing as well as the result of despreading at the MICT.

23. A RAKE receiver according to claim 1, wherein when two of the MICTs generated by the MICT generator overlap each other on a time axis, the timing selector selects only the MICT that gives the larger SNIR.

24. A RAKE receiver according to claim 1 wherein, when two of the MICTs generated by the MICT generator overlap each other on a time axis, the timing selector selects only the MICT where the signal power or the SNIR of an interference path is larger.

25. A RAKE receiver according to claim 1 wherein, when two of the MICTs generated by the MICT generator overlap each other on a time axis, the timing selector uses the result of despreading at the overlapped timing as the result of despreading at the two MICTs.

26. A receiver for receiving a direct code spread signal, comprising:
   first timing detecting means for detecting path timings of multipaths;
   second timing detecting means for detecting, based on each of the detected timings, a timing for obtaining an interference reducing signal;
   timing assigning means for assigning selected ones of the plurality of timings detected by the first and second timing detecting means to a plurality of despreaders, respectively; and
   a combiner for combining outputs of the plurality of despreaders, wherein
   the second timing detecting means is a means for detecting a timing located on a time axis at a position symmetric to another timing which is one of the timings detected by the first timing detecting means, the two timings being located symmetrically to each other with respect to a selected one of the timings likewise detected b the first timing means, and
   the timing assigning means also assigns the selected one of the timings when assigning the timing detected by the second timing detecting means.

27. A receiver according to claim 26, wherein the timing assigning means includes a changing means for changing any one of the assigned timings to another timing based on signal quality after the RAKE combining so as to improve the quality.

28. A RAKE receiver according to claim 15, wherein the sixth processing means evaluates the signal power expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = \frac{\sigma_i^2}{\sigma_i^2 - \frac{|\alpha_i|^2|\alpha_j|^2 I^2}{RSSI}}$$

where $\sigma_i^2$ is signal variance at the path i, $|\alpha_i|^2$ and $|\alpha_j|^2$ are signal powers for the paths i and j, respectively, $I^2$ is a transmitter's transmitting power estimated at receiving end, and RSSI is received signal intensity.

29. A RAKE receiver according to claim 15, wherein the sixth processing means evaluates the signal power expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_i|^2}{|\alpha_j|^2}$$

where $|\alpha_i|^2$ and $|\alpha_j|^2$ are signal powers for the paths i and j, respectively.

30. A RAKE receiver according to claim 15, wherein the sixth processing means evaluates the signal power expected to be achieved by the MIXR combining by evaluating an improvement $\eta_{ij}$ in SNIR expected to be achieved by the MIXR combining performed using a MICT for a path i with a path j as an interference path, the improvement $\eta_{ij}$ being calculated by the equation $$\eta_{ij} = 1 + \frac{|\alpha_j|^2}{|\alpha_i|^2}$$

where $|\alpha_i|^2$ and $|\alpha_j|^2$ are signal powers for the paths i and j, respectively.

* * * * *